(12) United States Patent
Shin et al.

(10) Patent No.: US 12,397,618 B2
(45) Date of Patent: Aug. 26, 2025

(54) MOBILITY HAVING NEGATIVE PRESSURE SPACE AND PRESSURE CONTROL METHOD

(71) Applicants: Hyundai Motor Company, Seoul (KR); Kia Corporation, Seoul (KR)

(72) Inventors: Gee Young Shin, Suwon-si (KR); Su Yeon Kang, Seoul (KR); Dae Hee Lee, Incheon (KR); Myung Hoe Kim, Seoul (KR); Dong Ho Kwon, Yongin-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 568 days.

(21) Appl. No.: 17/874,807

(22) Filed: Jul. 27, 2022

(65) Prior Publication Data
US 2023/0139388 A1 May 4, 2023

(30) Foreign Application Priority Data
Nov. 2, 2021 (KR) .................. 10-2021-0148781

(51) Int. Cl.
*B60H 1/24* (2006.01)
*B60H 1/00* (2006.01)

(52) U.S. Cl.
CPC ......... *B60H 1/248* (2013.01); *B60H 1/00849* (2013.01)

(58) Field of Classification Search
USPC .................................................... 454/69–165
See application file for complete search history.

(56) References Cited

U.S. PATENT DOCUMENTS

| | | | | |
|---|---|---|---|---|
| 2012/0199003 A1* | 8/2012 | Melikov | ............... | G16H 50/80 454/192 |
| 2023/0339296 A1* | 10/2023 | Bobryshev | ........... | B60H 3/0608 |

FOREIGN PATENT DOCUMENTS

KR 10-2206093 B1 1/2021

* cited by examiner

*Primary Examiner* — Ko-Wei Lin
(74) *Attorney, Agent, or Firm* — Morgan, Lewis & Bockius LLP (57) ABSTRACT

In a mobility including a negative pressure space and method for controlling a pressure of the mobility in which the mobility is used a general vehicle in normal times, and when a special situation such as transferring infectious disease patients occurs, an internal space includes a general space and a negative pressure space by a partition wall, so that the infectious disease patients are safely transferred through the negative pressure space and the spread of infectious diseases is prevented. As a result, the usability of a vehicle is increased, and it is possible to respond to such special situation.

19 Claims, 9 Drawing Sheets

MOBILITY HAVING NEGATIVE PRESSURE SPACE AND PRESSURE CONTROL METHOD

CROSS REFERENCE TO RELATED APPLICATION

The present application claims priority to Korean Patent Application No. 10-2021-0148781, filed Nov. 2, 2021, the entire contents of which is incorporated herein for all purposes by this reference.

BACKGROUND OF THE PRESENT DISCLOSURE

Field of the Present Disclosure

The present disclosure relates to a mobility including a negative pressure space that forms a negative pressure space therein when transporting respiratory disease patients to prevent disease transmission by the respiratory disease patients and a method for controlling a pressure of the mobility.

Description of Related Art

In general, infectious diseases such as Middle East respiratory syndrome (MERS), severe acute respiratory syndrome (SARS), anthrax, Ebola virus disease, and Corona virus disease 19 (COVID-19) are transmitted through a respiratory system, so it is difficult to predict the route of transmission and the rate of spread of these diseases is fast, so immediate isolation is required.

Patients with these infectious diseases must be isolated promptly to block the route of infection and prevent further spread.

However, when a vehicle is used to isolate and transport such infectious disease patients, there is a problem in that all passengers inside the vehicle are infected with the disease through the infectious disease patient.

Furthermore, in the case of an ambulance, other equipment is placed inside, and as a place for isolating infectious disease patients is limited, it is difficult to use the ambulance for multi-purposes except for medical purposes, limiting its use.

The information included in this Background of the present disclosure section is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a mobility which is used as a general vehicle in normal times and forms a negative pressure space inside the mobility when a special situation such as transporting infectious disease patients to prevent the spread of an infectious disease, and a method for controlling a pressure of the mobility.

In various aspects of the present disclosure, a mobility including a negative pressure space according to an exemplary embodiment of the present disclosure includes a mobility including an internal space; a partition wall that partitions the internal space of the mobility and includes an airflow path formed so that air flows in only one of the partitioned spaces so that any one of the partitioned spaces includes the negative pressure space; an air conditioning unit that is configured to blow the air into the internal space through an air discharge unit provided in the mobility; and an exhaust unit that is configured to discharge the air from the negative pressure space of the internal space of the mobility to an outside. Here, during the air conditioning unit and the exhaust unit are operated, as the air is discharged from another space through the airflow path of the partition wall to the outside through the exhaust unit, a negative pressure is formed in the negative pressure space.

The partition wall is formed to match the internal space of the mobility, and the airflow path is formed at a bottom portion of the partition wall.

The mobility further includes an opening and closing unit that configured to selectively open or close the airflow path formed on the partition wall, and the opening and closing unit is configured to be opened when the air flows from a remaining space of the partitioned spaces to the negative pressure space.

The opening and closing unit includes a bracket which is provided in the airflow path and includes an opening hole, and a shielding member which is provided in the opening hole and includes an upper portion rotatably connected to the bracket and a lower portion extending to be in contact with an end surface of the bracket on a side of the negative pressure space to cover the opening hole.

The air conditioning unit is configured to blow the air to a remaining space among the partitioned spaces except for the negative pressure space through the air discharge unit provided in front of the mobility.

The exhaust unit includes an exhaust passage that extends to a rear of the mobility in the negative pressure space, and an exhaust fan which is provided in the exhaust passage to discharge the air in the negative pressure space to the outside.

The partition wall is mounted to divide the internal space of the mobility into a front and a rear of the mobility, and the internal space partitioned by the partition wall includes a front internal space which is a general space and a rear internal space which is the negative pressure space.

The air conditioning unit includes a front air conditioning unit and a rear air conditioning unit, and the front air conditioning unit is configured to blow the air into the front internal space, and the rear air conditioning unit is configured to blow the air into the rear internal space.

The mobility further includes a control unit which is electrically connected to the air conditioning unit and the exhaust unit and configured to control the air conditioning unit and the exhaust unit, and the control unit is configured to receive an input of whether the partition wall is mounted in the internal space of the mobility according to occurrence of a patient, and controls to operate the air conditioning unit and the exhaust unit when the controller confirms the installation of the partition unit.

The control unit is configured to confirm whether the mobility is in an indoor air mode or an outdoor air mode when the partition wall is provided, and controls the air conditioning unit to be switched to the outdoor air mode.

When the partition wall is provided, the internal space includes a front internal space which is a general space and a rear internal space which is the negative pressure space, the air conditioning unit includes a front air conditioning unit and a rear air conditioning unit, the front air conditioning unit is configured to blow the air into the general space, and the rear air conditioning unit is configured to blow the air into the negative pressure space, the control unit is configured to control the front air conditioning unit to switch to an outdoor air mode, and the rear air conditioner unit to switch to an indoor air mode.

The control unit is further configured to receive pressure information on the general space and the negative pressure space partitioned by the partition wall, and controls an airflow volume of the front air conditioning unit to increase when a pressure difference in the general space and the negative pressure space reaches a predetermined level.

On the other hand, a method for controlling a pressure of the mobility including the negative pressure space according to an exemplary embodiment of the present disclosure includes the steps of confirming whether the partition wall is provided according to occurrence of a patient; switching the air conditioning unit to an outdoor air mode in accordance with confirmation of whether the air conditioning unit is an indoor air mode or the outdoor air mode when the installation of the partition wall is confirmed; and operating the air conditioning unit and the exhaust unit.

When the air conditioning unit includes a front air conditioning unit and a rear air conditioning unit, the front air conditioning unit is switched to the outdoor air mode and the rear air conditioning unit is switched to the indoor air mode in the switching step.

When the air conditioning unit includes a front air conditioning unit and a rear air conditioning unit, a temperature of the general space and the negative pressure space is individually controlled through operation of the front air conditioning unit and the rear air conditioning unit in the operating step.

The operating step further includes the steps of checking a pressure in the general space and the negative pressure space; and adjusting to increase an airflow volume of the front air conditioning unit when a pressure difference in the general space and the negative pressure space reaches a set level through the checking step.

In the mobility including the negative pressure space configured as described above and method for controlling the pressure of the mobility, the mobility is used a general vehicle in normal times, and when a special situation such as transferring infectious disease patients occurs, the internal space includes the general space and the negative pressure space by the partition wall, so that the infectious disease patients are safely transferred through the negative pressure space and the spread of infectious diseases is prevented. As a result, the usability of a vehicle is increased, and it is possible to respond to such special situation.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, a mobility including a negative pressure space and method for controlling a pressure according to various exemplary embodiments of the present disclosure will be described with reference to the accompanying drawings.

Figure 1:
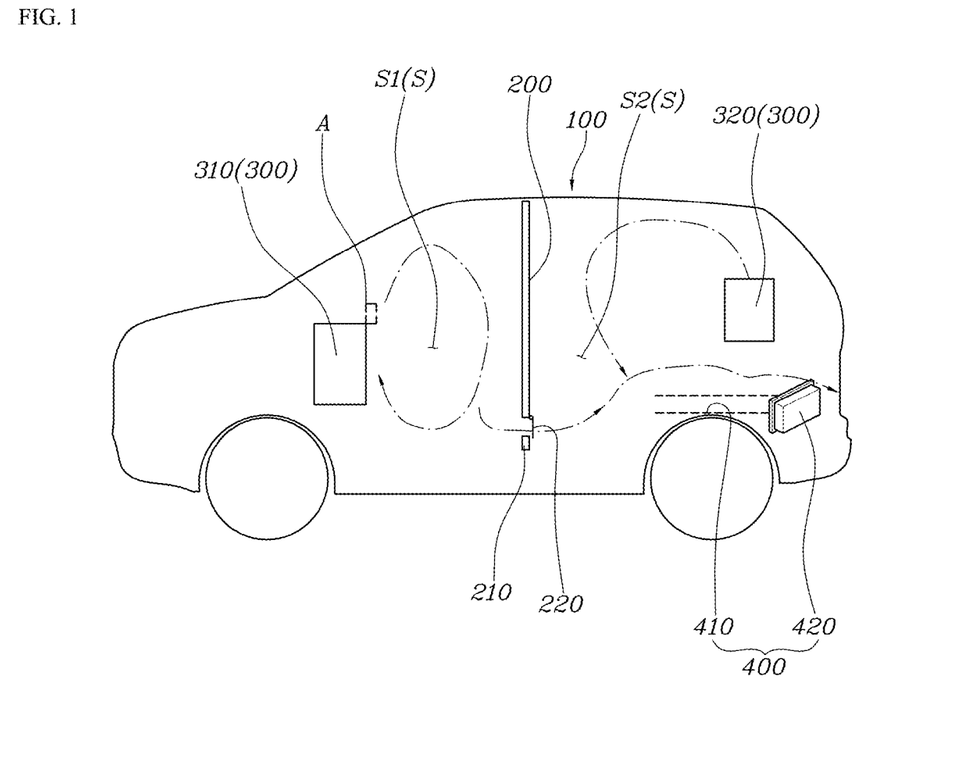
FIG. 1 is a view showing a mobility including a negative pressure space according to an exemplary embodiment of the present disclosure.
Figure 2:
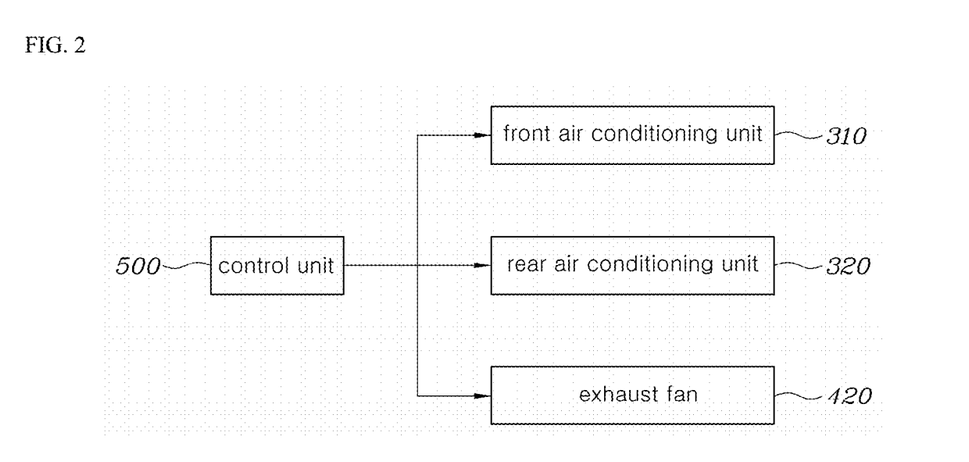
FIG. 2 is a configuration view of the mobility including the negative pressure space shown in FIG. 1.
Figure 3:
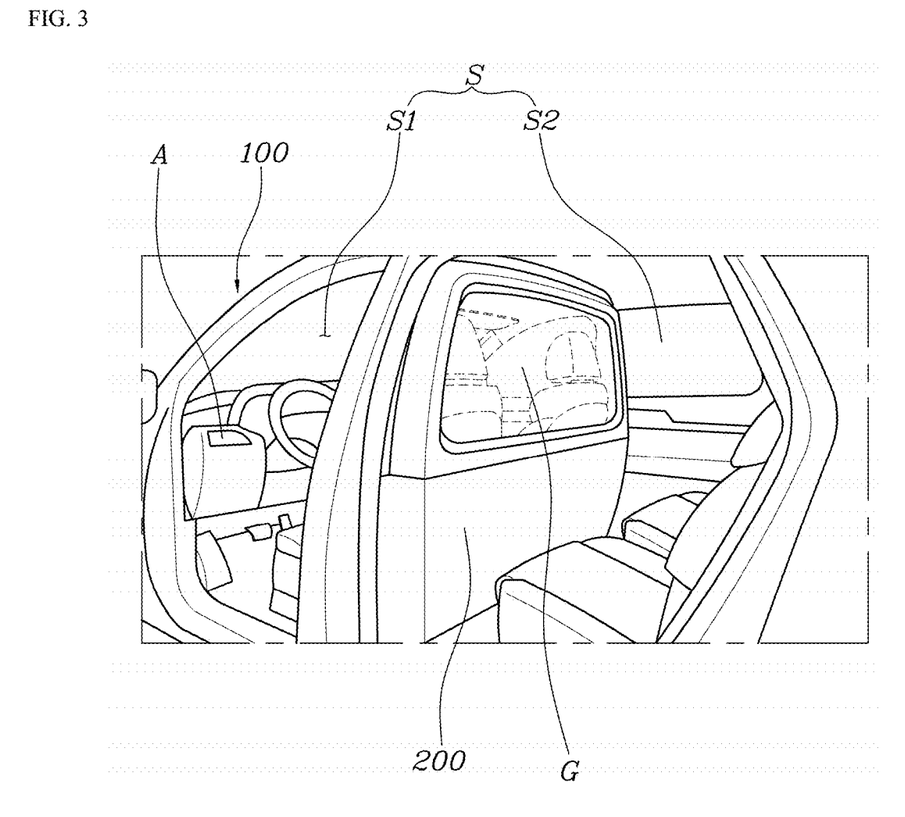
FIG. 3 is a view showing an internal space of a mobility.
Figure 4:
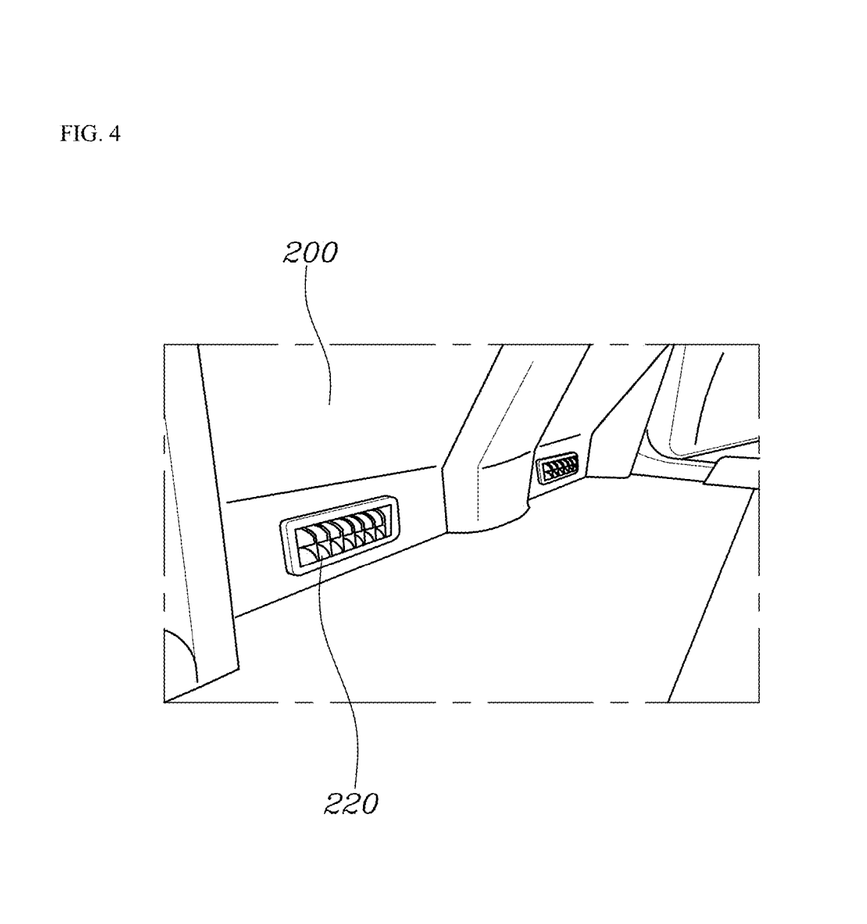
FIG. 4 is a view showing an airflow path of a partition wall according to an exemplary embodiment of the present disclosure.
Figure 5:
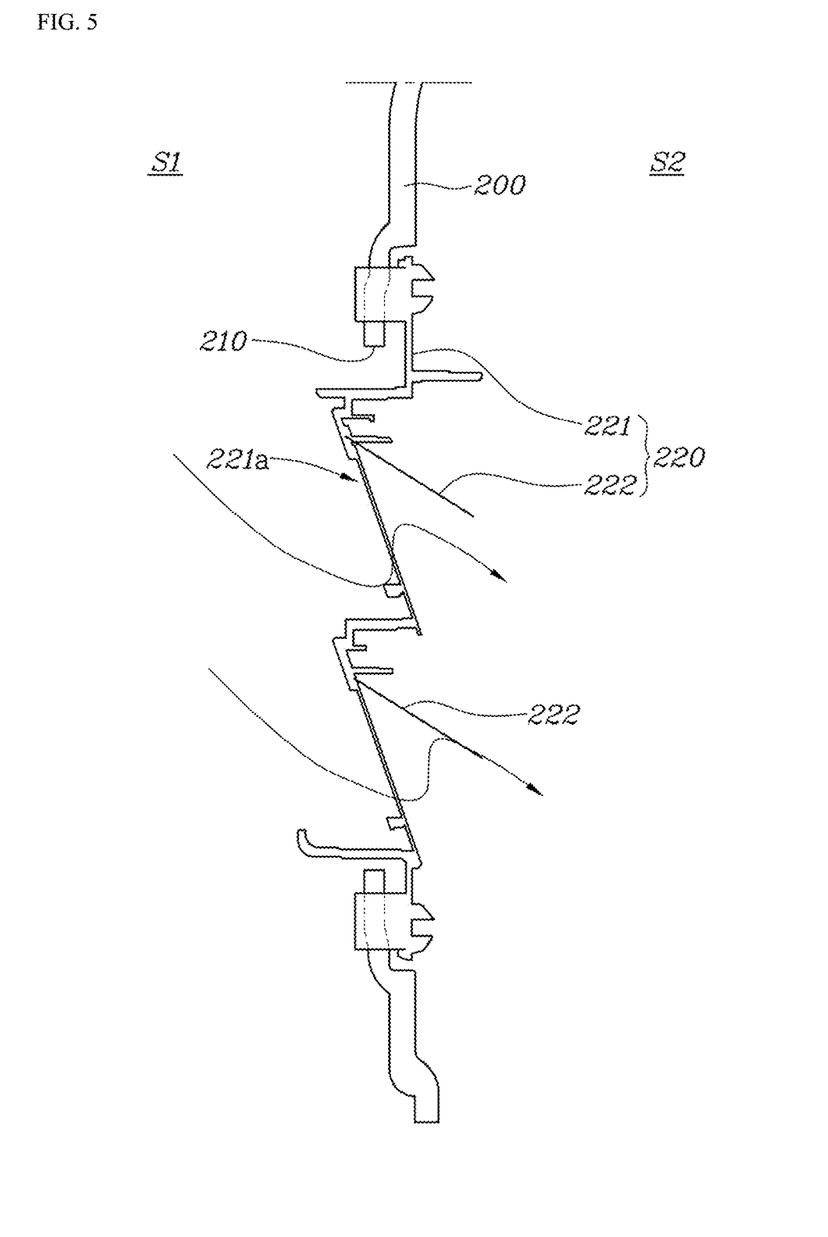
FIG. 5 is a view showing an open state of an opening and closing unit provided in a partition wall according to an exemplary embodiment of the present disclosure.
Figure 6:
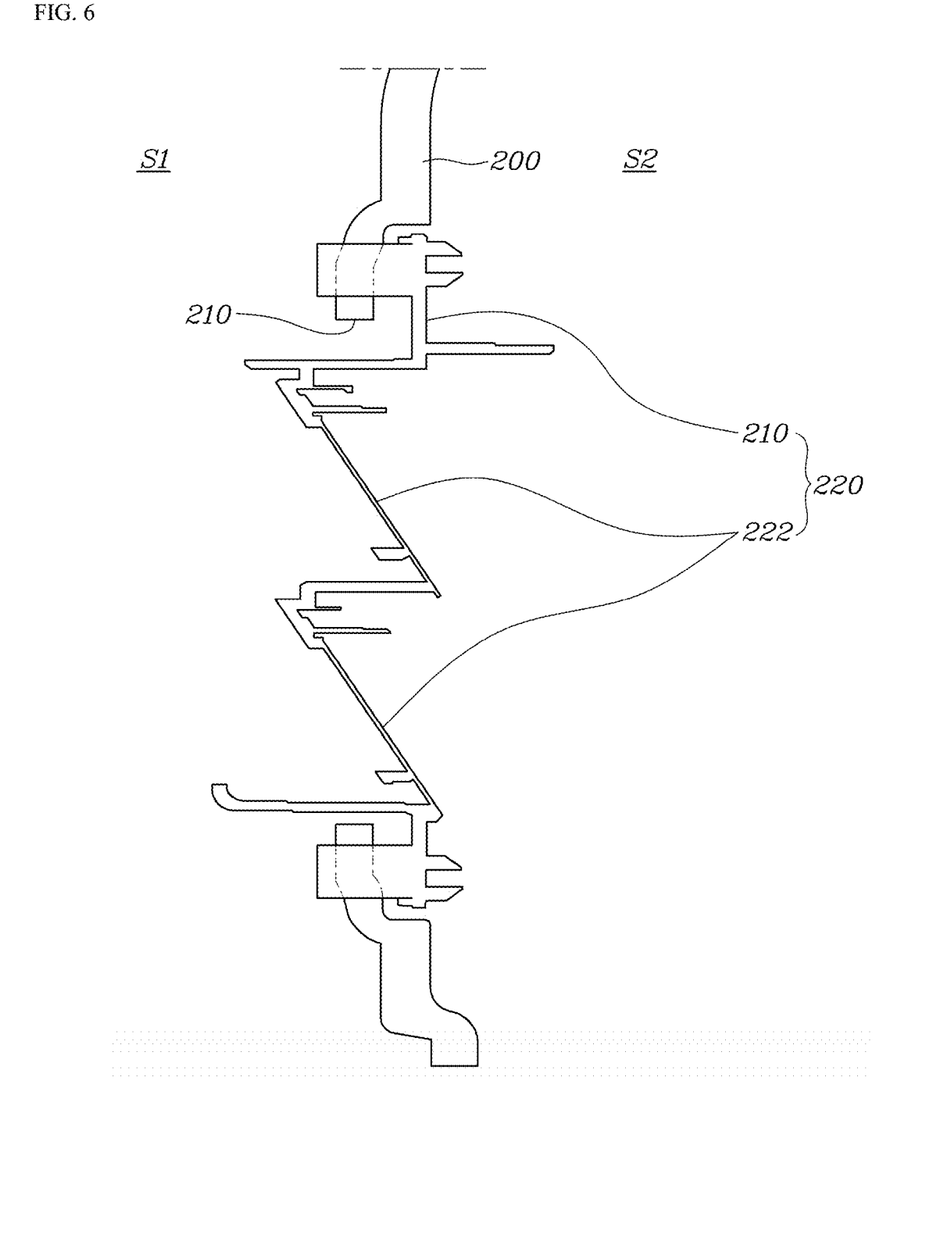
FIG. 6 is a view showing a closed state of an opening and closing unit provided in a partition wall according to an exemplary embodiment of the present disclosure.
Figure 7:
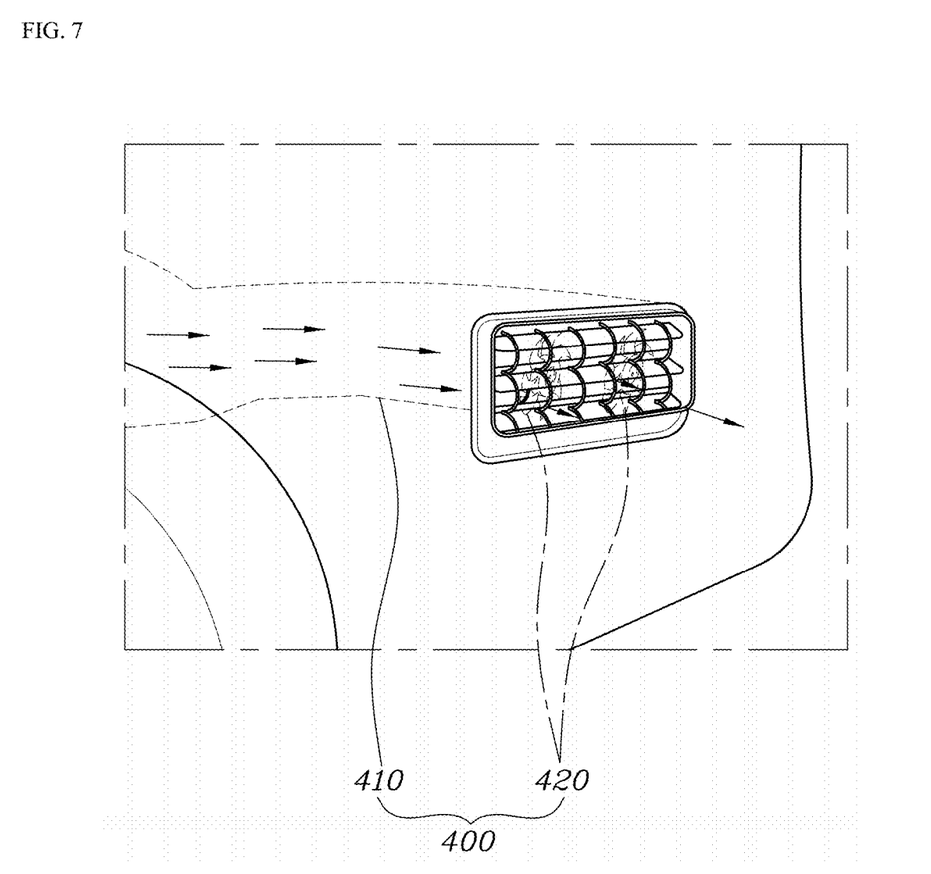
FIG. 7 is a view showing an exhaust unit according to an exemplary embodiment of the present disclosure.
Figure 8:
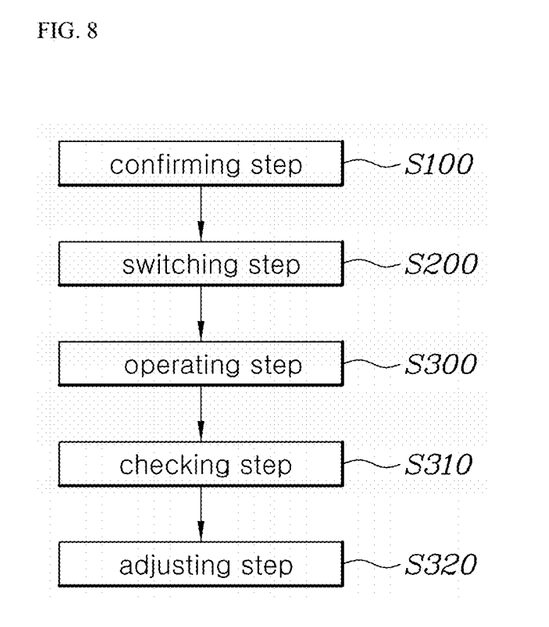
FIG. 8 is a flowchart of a method for controlling a pressure of a mobility including a negative pressure space according to an exemplary embodiment of the present disclosure.
Figure 9:
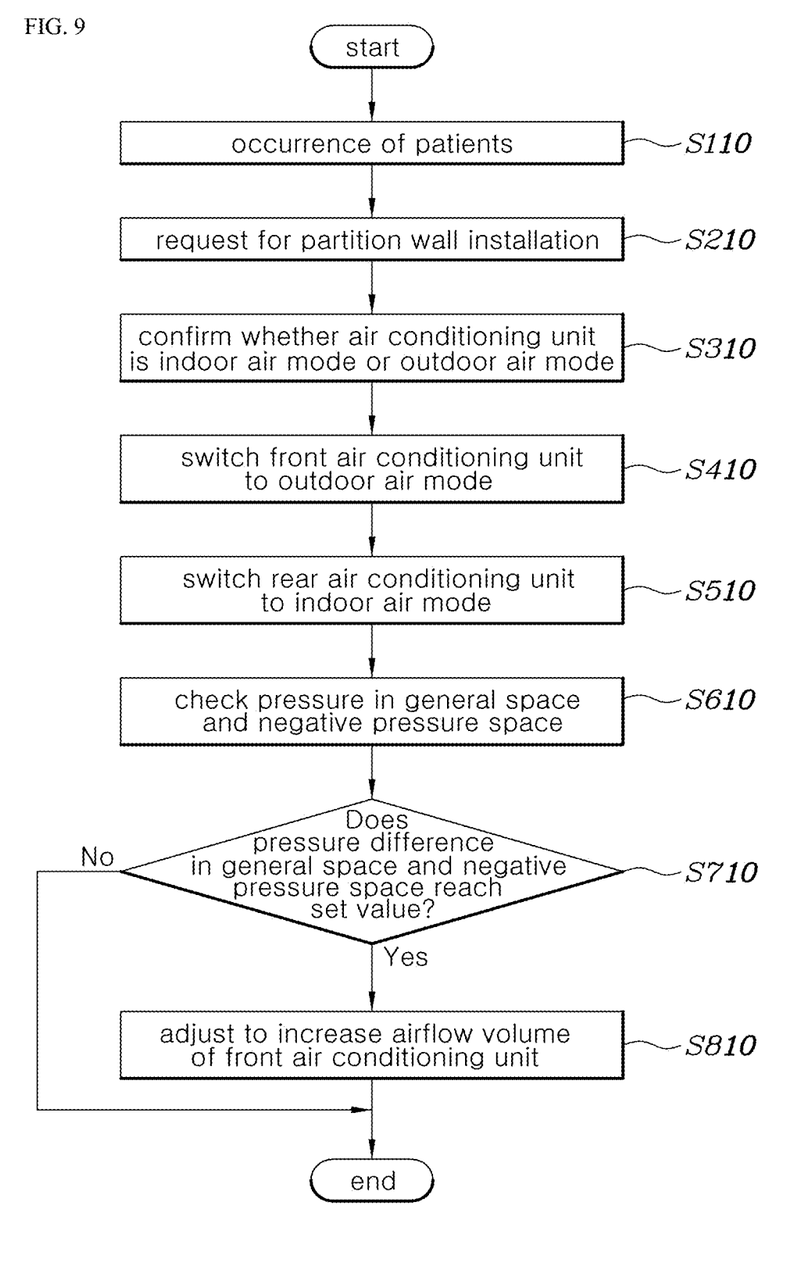
FIG. 9 is a view for explaining a control method of the present disclosure.

FIG. 1 is a view showing a mobility including a negative pressure space according to an exemplary embodiment of the present disclosure, FIG. 2 is a configuration view of the mobility including the negative pressure space shown in FIG. 1, FIG. 3 is a view showing an internal space of a mobility, FIG. 4 is a view showing an airflow path of a partition wall according to an exemplary embodiment of the present disclosure, FIG. 5 is a view showing an open state of an opening and closing unit provided in a partition wall according to an exemplary embodiment of the present disclosure, FIG. 6 is a view showing a closed state of an opening and closing unit provided in a partition wall according to an exemplary embodiment of the present disclosure, FIG. 7 is a view showing an exhaust unit according to an exemplary embodiment of the present disclosure, FIG. 8 is a flowchart of a method for controlling a pressure of a mobility including a negative pressure space according to an exemplary embodiment of the present disclosure, FIG. 9 is a view for explaining a control method of the present disclosure.

As shown in FIG. 1 and FIG. 2, a mobility including a negative pressure space according to an exemplary embodiment of the present disclosure includes a mobility 100 including an internal space (S); a partition wall that partitions the internal space of the mobility 100, and includes an airflow path 210 formed so that air flows in only one of the partitioned spaces so that any one of the partitioned spaces includes the negative pressure space (S2); an air conditioning unit 300 that blows the air into the internal space (S) through an air discharge unit (A) provided in the mobility 100; and an exhaust unit 400 that discharges the air from the negative pressure space (S2) of the internal space (S) of the mobility 100 to an outside.

Here, the mobility 100 may be a vehicle, and include the internal space (S) in which a passenger may be accommodated.

The mobility 100 is provided with the air conditioning unit 300, and the conditioned air generated in the air conditioning unit 300 is blown into the internal space (S) through the air discharge unit (A) provided in the mobility 100. The air conditioning unit 300 may form cooling air or heating air through circulation of a refrigerant and cooling water, and a heat pump may be applied thereto.

On the other hand, the partition wall 200 may be provided in the internal space (S) of the mobility (100). The partition wall 200 may be detachably provided in the internal space (S) of the mobility 100.

The partition wall 200 divides the internal space (S) into a plurality when provided inside the mobility 100 so that one of the partitioned spaces includes the negative pressure space (S2). Here, among the partitioned spaces of the mobility, other space except the negative pressure space (S2) becomes a general space (S1) in which the negative pressure is not formed, and the other space is used as the negative pressure space (S2). The airflow path 210 for allowing air to flow only to the negative pressure space (S2) is formed in the partition wall 200 so that the air flows between the general space (S1) and the negative pressure space (S2).

Furthermore, the mobility 100 is provided with the exhaust unit 400 that discharges the air in the internal space (S) to the outside. The exhaust unit 400 is configured to discharge the air from the negative pressure space (S2) side of the internal space (S) of the mobility 100 to the outside of the mobility, so that the infectious disease generated in the negative pressure space (S2) partitioned by partition wall 200 may be discharged to the outside, and a negative pressure may be formed in the negative pressure space.

Through this, in a state in which the partition wall 200 is provided in the internal space (S) of the mobility 100, during the air conditioning unit 300 and the exhaust unit 400 are operated, as the air passes through the airflow path 210 in the general space (S1) and is discharged to the outside through the exhaust unit 400, the negative pressure is formed in the negative pressure space (S2). That is, as the air generated through the air conditioning unit 300 in the internal space (S) of the mobility 100 fills the general space (S1), the pressure in the general space (S1) increases. The air in the general space (S1) is flowed to the negative pressure space (S2) through the airflow path 210 of the partition wall 200, but the air in the negative pressure space (S2) is discharged to the outside through the exhaust unit 400, so that the pressure in the negative pressure space (S2) is lowered. Accordingly, the negative pressure may be formed in the negative pressure space (S2), and as the air flows from the general space (S1) to the negative pressure space (S2), the infectious air in the negative pressure space (S2) is blocked from flowing back to the general space (S1) side.

Accordingly, the mobility 100 is utilized as a general mobility 100 when the partition wall 200 is not provided, and when the partition wall 200 is provided for the transfer of infectious disease patients, the internal space (S) is partitioned into the general space (S1) and the negative pressure space (S2), so that the mobility may be utilized as the emergency mobility 100 according to an emergency situation.

Detailed description of the present disclosure described above, as shown in FIG. 3, the partition wall 200 is mounted to partition the internal space (S) of the mobility 100 into a front and a rear. In the internal space (S) partitioned by the partition wall (200), the front internal space (S) is the general space (S1), and the rear internal space (S) is the negative pressure space (S2).

That is, the partition wall 200 is mounted to partition into front and rear with respect to the running direction of the mobility 100, so that the general space (S1) is formed in the front and the negative pressure space (S2) is formed in the rear.

If the negative pressure space (S2) is provided in the front in the internal space (S) of the mobility 100, the contaminated air may be reintroduced into the general space (S1) provided in the rear when the contaminated air is discharged to the outside.

Accordingly, in the mobility 100, as the air conditioning unit 300 draws in uncontaminated air from the front of the mobility 100 and discharges it to the general space (S1), the risk of contamination of the general space (S1) is reduced, and the contaminated air generated in the negative pressure space (S2) is discharged to the rear of the mobility 100 through the exhaust unit 400 to prevent the contaminated air from being reintroduced into the mobility.

Furthermore, when the mobility 100 is operated, the airflow is naturally formed from the general space (S1) provided at the front to the negative pressure space (S2) provided at the rear. In the general space (S1) and the negative pressure space (S2), a negative pressure is formed in the negative pressure space (S2) by the pressure difference according to the airflow. Thus, the general space (S1) and the negative pressure space (S2) may be separated.

Accordingly, the air conditioning unit 300 allows the air to flaw into the general space (S1) through the air discharge unit (A) provided in front of the mobility 100. That is, the mobility 100 is provided with a plurality of air discharge units (A) for discharging the conditioned air generated by the air conditioning unit 300 to the internal space (S). By allowing the air to flaw into the general space (S1) through the air discharge unit (A) provided in front of the mobility (100) during transport of infectious disease patients, the general space (S1) has a higher pressure compared to the negative pressure space (S2), as the air flows from the general space (S1) to the negative pressure space (S2) through the airflow path 210 of the partition wall 200, the contaminated air in the negative pressure space (S2) is not flawed to the general space (S1).

Meanwhile, as shown in FIG. 4, the partition wall 200 is formed to match the internal space (S) of the mobility 100, and the airflow path 210 is formed at the bottom portion.

Accordingly, as the partition wall 200 is formed to match the internal space (S) of the mobility 100, the internal space (S) may be divided into the general space (S1) and the negative pressure space (S2). A sealing material is applied along the rim to block the airflow between the general space (S1) and the negative pressure space (S2). A glass portion (G) is applied to the partition wall 200 to confirm the situation of the negative pressure space (S2) in the general space (S1).

Furthermore, the airflow path 210 is formed at the bottom portion of the partition wall 200, restricting the flow of the contaminated air generated in the negative pressure space (S2) to the general space (S1) side. Furthermore, when the pressure in the general space (S1) reaches a certain level, as the air gradually flows to the negative pressure space (S2) through the airflow path (210) of the partition wall 200, the negative pressure is easily formed in the negative pressure space (S2) through the airflow between the general space (S1) and the negative pressure space (S2).

On the other hand, the partition wall 200 is provided with an opening and closing unit 220 that selectively opens or closes the airflow path 210, and the opening and closing unit 220 is configured to be opened when the air flows from the general space (S1) to the negative pressure space (S2).

As shown in FIG. 5, the opening and closing unit 220 is provided in the partition wall 200, and the airflow path 210 is selectively opened by the opening and closing unit 220. The opening and closing unit 220 is configured to be opened only when the air flows from the general space (S1) to the negative pressure space (S2), so that the airflow is allowed from the general space (S1) to the negative pressure space (S2), but when the air flows from the negative pressure space (S2) to the general space (S1), the opening and closing unit 220 is closed, so that the contaminated air in the negative pressure space (S2) is blocked from flowing into the general space (S1).

In detail, as shown in FIG. 4, FIG. 5 and FIG. 6, the opening and closing unit 220 includes a bracket 221 which is provided in the airflow path 210 and includes an opening hole 221*a* formed, and a shielding film 222 which is provided in the opening hole 221*a* and includes an upper portion rotatably connected to the bracket 221, and a lower portion extending to be in contact with an end surface of the bracket 221 on the side of the negative pressure space (S2) to cover the opening hole 221*a*.

That is, the opening and closing unit 220 includes the bracket 221 and the shielding film 222. Here, the bracket 221 is provided in the airflow path 210 to allow the air to flow through the opening hole 221*a*.

The shielding film 222 for opening and closing the opening hole 221*a* is rotatably provided in the bracket 221. The shielding film 222 is formed to cover the opening hole 221*a*, the upper portion of the shielding film is rotatably connected to the bracket 221, and the lower portion of the shielding film is in contact with the end surface of the bracket 221 on the side of the negative pressure space (S2).

For the present reason, as may be seen in FIG. 5, when the air flows from the general space (S1) to the negative pressure space (S2) through the opening hole 221*a*, the shielding film 222 is rotated by the airflow to open the opening hole 221*a*, allowing the air to flow from the general space (S1) to the negative pressure space (S2).

Conversely, as shown in FIG. 6, when the air flows from the negative pressure space (S2) to the general space (S1) through the opening hole 221*a*, the shielding film 222 is rotated according to the direction of the airflow and its own weight to close the opening hole 221*a*, blocking the airflow from the negative pressure space (S2) to the general space (S1).

The above-described opening hole 221*a* of the bracket 221 and the shielding film 222 may be configured in plurality. Accordingly, as one shielding film 222 is opened and closed, the excessive airflow is prevented, so that the airflow from the general space (S1) to the negative pressure space (S2) is stabilized.

On the other hand, as shown in FIG. 7, the exhaust unit 400 includes an exhaust passage 410 that extends to the rear of the mobility 100 in the negative pressure space (S2), and an exhaust fan 420 which is provided in the exhaust passage 410 to discharge the air in the negative pressure space (S2) to the outside.

In the present way, the exhaust unit 400 includes the exhaust passage 410 and the exhaust fan 420. The exhaust passage 410 extends to the rear of the mobility 100 in the negative pressure space (S2) of the internal space (S) of the mobility 100. Therefore, the contaminated air discharged to the outside through the exhaust passage 410 is blocked to be reintroduced into the mobility.

Furthermore, the exhaust fan 420 is provided in the exhaust passage 410, and when the exhaust fan 420 is operated, the air in the negative pressure space (S2) is discharged to the outside. The exhaust fan 420 may be provided on the outlet side of the exhaust passage 410, and a grill for protecting the exhaust fan 420 may be provided at the outlet of the exhaust passage 410.

Accordingly, when the exhaust fan 420 is operated, the air in the negative pressure space S2 is discharged to the outside through the exhaust passage 410, so that the pressure in the negative pressure space S2 is lowered, and a negative pressure is formed in the negative pressure space (S2). As the contaminated air in the negative pressure space (S2) is discharged to the rear of the mobility 100, the reintroduction of the contaminated air into the mobility is prevented.

On the other hand, the air conditioning unit 300 includes a front air conditioning unit 310 and a rear air conditioning unit 320. The front air conditioning unit 310 blows air into the front of the internal space (S), the rear air conditioning unit 320 blows air into the rear of the internal space (S).

Accordingly, the air conditioning unit 300 includes the front air conditioning unit 310 and the rear air conditioning unit 320, securing the air conditioning performance of the mobility 100. When the internal space (S) of the mobility 100 is partitioned into the general space (S1) and the negative pressure space (S2) by the partition wall 200, as the conditioned air blows only in the general space (S1), the comfortability in the negative pressure space (S2) is reduced.

Accordingly, the front air conditioning unit 310 provides the conditioned air to the front of the internal space (S), the general space (S1), and the rear air conditioning unit 320 provides the conditioned air to the rear of the internal space (S), the negative pressure space (S2), so that it is possible to secure the comfortability both in the general space (S1) and the negative pressure space (S2).

In the instant case, by setting the airflow volume of the front air conditioning unit 310 to be greater than that of the rear air conditioning unit 320, the pressure in the general space (S1) is maintained higher than the pressure in the negative pressure space (S2). Accordingly, the comfortability of the internal space (S) of the mobility 100 is secured as the conditioned air is provided, and as a negative pressure is formed in the negative pressure space (S2), the flowing of the contaminated air to the general space (S1) is blocked Meanwhile, the air conditioning unit 300 and the exhaust unit 400 described above are controlled by the control unit 500. That is, through the control of the air conditioning unit 300 and the exhaust unit 400 by the control unit 500 when a transfer of an infectious disease patient occurs, the mobility may be utilized as an emergency mobility in which a negative pressure is formed in the negative pressure space (S2) among the general space (S1) and the negative pressure space (S2) partitioned by the partition wall 200.

In detail, the control unit 500 receives an input of whether the partition wall 200 is provided when the transferring of an infectious disease patient occurs, and controls the air conditioning unit 300 and the exhaust unit 400 to be operated when the installation of the partition wall 200 is confirmed.

Here, whether the partition wall 200 is provided may be determined by an input command in the mobility 100 or sensing the partition wall 200 through a detector. Through this, the control unit 500 controls the operation of the air conditioning unit 300 and the exhaust unit 400 according to the transfer of the infectious disease patient upon completion of the installation of the partition wall 200, forming a negative pressure in the negative pressure space (S2) in the internal space (S) of the mobility 100 partitioned by the partition wall 200.

The control unit 500 confirms whether it is an indoor air mode or an outdoor air mode when the partition wall 200 is provided, and controls the air conditioning unit 300 to be switched to the outdoor air mode.

Accordingly, when the installation of the partition wall 200 is completed, the control unit 500 controls to switch to the outdoor air mode so that external air flows into the internal space (S) of the mobility 100. That is, when transferring the infectious disease patient, the contaminated air in the internal space (S) may be recirculated when switching to the indoor air mode. That is, when the contaminated air in the negative pressure space (S2) is recirculated through the air conditioning unit 300 and discharged to the general space (S1), the air in the general space (S1) is also contaminated and the infectious disease is spread. Thus, the control unit 500 is to switch to the outdoor air mode when the partition wall 200 is provided, so that the contamination of the air in the general space (S1) is blocked.

On the other hand, in another exemplary embodiment of the present disclosure, when the air conditioning unit 300 includes the front air conditioning unit 310 and the rear air conditioning unit 320, the control unit 500 controls the front air conditioning unit 310 to be switched to the outdoor air mode, and the rear air conditioning unit 320 to be switched to the indoor air mode.

That is, the front air conditioning unit 310 is configured to blow air into the general space (S1), and the rear air conditioning unit 320 is configured to blow air into the negative pressure space (S2). The front air conditioning unit 310 draws the external air and blows it into the general space (S1) in the outdoor air mode, and draws the air in the general space (S1) and recirculates it in the general space (S1) in the indoor air mode. Furthermore, the rear air conditioning unit 320 draws the external air and blows it into the negative pressure space (S2) in the outdoor air mode, and draws the air in the negative pressure space (S2) and recirculates it in the negative pressure space (S2) in the indoor air mode.

When the front air conditioning unit 310 and the rear air conditioning unit 320 are constituted in the present way, individual air conditioning in the general space (S1) and the negative pressure space (S2) partitioned by the partition wall 200 may be performed.

Accordingly, when the partition wall 200 is provided according to the transfer of the infectious disease patient, the control unit 500 controls the front air conditioning unit 310 to be switched to the outdoor air mode so that external uncontaminated air flows into the general space (S1), and controls the rear air conditioning unit 320 to be switched to the indoor air mode so that the conditioned air is supplied only to the negative pressure space (S2).

Accordingly, by separating the air conditioning unit 300 for controlling the temperature of the general space (S1) and the negative pressure space (S2), individual temperature control of the general space (S1) and the negative pressure space (S2) is possible. Furthermore, a flow is formed in which the air in the general space (S1) flows to the negative pressure space S2 through the airflow path 210 of the partition wall 200, so that the contaminated air in the negative pressure space S2 is prevented to flow to the general space (S1).

Meanwhile, the control unit 500 may further receive pressure information on the general space (S1) and the negative pressure space (S2) partitioned by the partition wall 200. Here, the internal pressure of the general space (S1) and the negative pressure space (S2) may be measured through a detector provided in the internal space (S), and the corresponding pressure information is transmitted to the control unit 500.

Through this, when a pressure difference in the general space (S1) and the negative pressure space (S2) reaches a set level, the control unit 500 controls the airflow volume of the front air conditioning unit 310 to be increased. Here, the preset level set in the control unit 500 may be set to a range in which the air in the negative pressure space (S2) does not flow back into the general space (S1) according to the pressure difference in the general space (S1) and the negative pressure space (S2).

Accordingly, in an exemplary embodiment of the present disclosure, because the air in the negative pressure space (S2) is not flowed to the general space (S1) when the pressure in the general space (S1) is higher than the pressure in the negative pressure space (S2), a state in which the pressure in the general space (S1) is higher than that in the negative pressure space (S2) has to be maintained. Accordingly, the control unit 500 receives the pressure information on the general space (S1) and the negative pressure space (S2), and when the pressure difference in the general space (S1) and the negative pressure space (S2) reaches a set level, the control unit 500 controls the airflow volume of the front air conditioning unit 310 to be increased, so that the pressure in the general space (S1) is increased.

On the other hand, a method for controlling a pressure of the mobility 100 including the negative pressure space S2 according to an exemplary embodiment of the present disclosure, as shown in FIG. 8 and FIG. 9, includes the steps of confirming whether the partition wall 200 is provided according to occurrence of a patient (S100, S110); switching the air conditioning unit to the outdoor air mode by confirming whether the air conditioning unit 300 is the indoor air mode or the outdoor air mode when the installation of the partition wall 200 is confirmed (S200, S210, S310, S410, S510); and operating the air conditioning unit and the discharging unit (S300).

That is, in a situation in which an infectious disease patient is transported, it is confirmed whether the partition wall 200 is provided according to the occurrence of the patient, and when the installation of the partition wall 200 is confirmed, the air conditioning unit 300 is switched to the outdoor air mode so that the external air may be introduced into the internal space (S) of the mobility 100. Furthermore, by allowing the air conditioning unit 300 and the exhaust unit 400 to be operated, the external air is introduced into the general space (S1), and the air in the general space (S1) flows to the negative pressure space (S2) through the airflow path 210 of the partition wall 200, and is discharged to the outside through the exhaust unit 400, forming a negative pressure in the negative pressure space (S2).

On the other hand, in the switching step (S200), when the air conditioning unit 300 includes the front air conditioning unit 310 and the rear air conditioning unit 320, the front air conditioning unit 310 is switched to the outdoor air mode, and the rear air conditioning unit 320 is switched to the indoor air mode.

Furthermore, in the operating step (S300), when the air conditioning unit 300 includes the front air conditioning unit 310 and the rear air conditioning unit 320, the temperature of the general space (S1) and the negative pressure space (S2) is individually controlled through operation of the front air conditioning unit 310 and the rear air conditioning unit 320.

That is, the front air conditioning unit 310 provides the conditioned air to the general space (S1) which is the front of the internal space (S), and the rear air conditioning unit 320 provides the conditioned air to the negative pressure space (S2) which is the rear of the internal space (S). Accordingly, the comfortability in both the general space (S1) and the negative pressure space (S2) may be secured.

In the instant case, the airflow volume in the front air conditioning unit 310 sets to be greater than that in the rear air conditioning unit 320, so that the pressure in the general space (S1) is maintained higher than the pressure in the negative pressure space (S2). Accordingly, as the conditioned air is provided in the internal space (S) of the mobility 100, the comfortability in the internal space (S) of the mobility (100) is secured and a negative pressure is formed in the negative pressure space (S2), so that the flow of the contaminated air to the general space (S1) is blocked Accordingly, in an exemplary embodiment of the present disclosure, when the partition wall 200 is provided according to the transfer of an infectious disease patient, the front air conditioning unit 310 is switched to the outdoor air mode so that external uncontaminated air flows into the general space (S1), and the rear air conditioning unit 320 is switched to the indoor air mode so that the conditioned air is supplied only to the negative pressure space (S2).

Accordingly, because the air conditioning unit 300 for the temperature control of the general space (S1) and the negative pressure space (S2) is separated, the individual temperature control of the general space (S1) and the negative pressure space (S2) is possible, and the airflow is formed so that the air in the general space (S1) flows to the negative pressure space (S2) through the airflow path 210 of the partition wall 200, so that the contaminated air in the negative pressure space (S2) is blocked from flowing into the general space S1.

On the other hand, the operating step (S300) further includes the steps of checking the pressure in the general space (S1) and the negative pressure space (S2) (S310); and adjusting to increase the airflow volume of the air conditioning unit 310 when the pressure difference in the general space (S1) and the negative pressure space (S2) reaches a set level through the checking step (S310) (S320) (S610).

Accordingly, in an exemplary embodiment of the present disclosure, when the pressure difference in the general space (S1) and the negative pressure space (S2) reaches a set level, the airflow volume of the front air conditioning unit 310 is increased (S710, S810).

That is, in an exemplary embodiment of the present disclosure, because the air in the negative pressure space (S2) is not flowed to the general space (S1) when the pressure in the general space (S1) is higher than the pressure in the negative pressure space (S2), a state in which the pressure in the general space (S1) is higher than that in the negative pressure space (S2) has to be maintained. Accordingly, when the pressure difference in the general space (S1) and the negative pressure space (S2) reaches a set level, the airflow volume of the front air conditioning unit 310 is increased, so that the pressure in the general space (S1) is increased.

In the mobility 100 including the negative pressure space (S2) configured as described above and the method for controlling a pressure of the mobility, the mobility is usually used as a general vehicle, and when a special situation such as the transfer of an infectious disease patient occurs, the internal space (S) is partitioned into the general space (S1) and the negative pressure space (S2) by the partition wall 200, so that the infectious disease patient is safely transported by the negative pressure space (S2) and the spread of the infectious disease is prevented. Accordingly, the usability of a vehicle is increased, and it is possible to respond to the special situation.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the control device may be implemented in a form of hardware or software, or may be implemented in a combination of hardware and software.

Furthermore, the terms such as "unit", "module", etc. Included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A mobility including a negative pressure space therein, the mobility comprising:
   an internal space;
   a partition wall that partitions the internal space of the mobility into partitioned spaces and includes an airflow path formed so that air flows in one of the partitioned spaces, wherein the one of the partitioned spaces includes the negative pressure space;
   an air conditioning unit that is configured to blow the air into the internal space through an air discharge unit provided in the mobility; and
   an exhaust unit that is configured to discharge the air from the negative pressure space of the internal space of the mobility to an outside of the mobility,
   wherein during the air conditioning unit and the exhaust unit are operated, as the air is discharged from the negative pressure space through the airflow path of the partition wall to the outside through the exhaust unit, a negative pressure is formed in the negative pressure space.

2. The mobility of claim 1, wherein the partition wall is formed to match the internal space of the mobility, and the airflow path is formed at a bottom portion of the partition wall.

3. The mobility of claim 1, further including an opening and closing unit that configured to selectively open or close the airflow path formed on the partition wall,
   wherein the opening and closing unit is configured to be opened when the air flows from a remaining space of the partitioned spaces to the negative pressure space.

4. The mobility of claim 3, wherein the opening and closing unit includes:
   a bracket which is provided in the airflow path and includes an opening hole; and
   a shielding member which is provided in the opening hole and includes an upper portion rotatably connected to the bracket and a lower portion extending to selectively contact with an end surface of the bracket on a side of the negative pressure space to cover the opening hole.

5. The mobility of claim 1, wherein the air conditioning unit is configured to blow the air to a remaining space among the partitioned spaces except for the negative pressure space through the air discharge unit provided in front of the mobility.

6. The mobility of claim 1, wherein the exhaust unit includes:
   an exhaust passage that extends to a rear of the mobility in the negative pressure space; and
   an exhaust fan which is provided in the exhaust passage to discharge the air in the negative pressure space to the outside.

7. The mobility of claim 1, wherein the partition wall is mounted to divide the internal space of the mobility into a front and a rear of the mobility to include a front internal space and a rear internal space which is the negative pressure space.

8. The mobility of claim 7,
   wherein the air conditioning unit includes a front air conditioning unit portion and a rear air conditioning portion, and
   wherein the front air conditioning portion is configured to blow the air into the front internal space, and the rear air conditioning portion is configured to blow the air into the rear internal space.

9. The mobility of claim 8, further including:
   a control unit which is electrically connected to the front air conditioning portion, the rear air conditioning portion and the exhaust unit and configured to control the front air conditioning portion, the rear air conditioning portion and the exhaust unit,
   wherein a temperature of the front internal space and a temperature of the rear internal space are individually controlled by the control unit through operation of the front air conditioning portion, the rear air conditioning portion and the exhaust unit.

10. The mobility of claim 8, further including:
    a control unit which is electrically connected to the front air conditioning portion and the rear air conditioning portion and configured to control the front air conditioning portion, the rear air conditioning portion,
    wherein the control unit is configured for:
      checking a pressure in the front internal space and a pressure of the rear internal space; and
      increasing an airflow volume of the front air conditioning portion when a pressure difference between the front internal space and the rear internal space reaches a set level through the checking.

11. The mobility of claim 1, further including:
    a control unit which is electrically connected to the air conditioning unit and the exhaust unit and configured to control the air conditioning unit and the exhaust unit,
    wherein the control unit is configured to receive an input of whether the partition wall is mounted in the internal space of the mobility according to occurrence of a patient, and configured to control to operate the air conditioning unit and the exhaust unit when the controller confirms the mounting of the partition unit.

12. The mobility of claim 11, wherein the control unit is configured to confirm whether the air conditioning unit is in an indoor air mode or an outdoor air mode when the partition wall is provided, and configured to control the air conditioning unit to be switched to the outdoor air mode when the air conditioning unit is in the outdoor air mode.

13. The mobility of claim 11,
wherein when the partition wall is provided, the internal space divided by the partition wall to be the partitioned spaces includes:
a front internal space; and
a rear internal space which is the negative pressure space,
wherein the air conditioning unit includes a front air conditioning portion and a rear air conditioning portion, the front air conditioning portion is configured to blow the air into the front internal space, and the rear air conditioning portion is configured to blow the air into the negative pressure space,
wherein the control unit is configured to control at least one of the front air conditioning portion and the rear air conditioner portion to switch to an outdoor air mode or an indoor air mode.

14. The mobility of claim 13, wherein the control unit is further configured to receive pressure information on the front internal space and the rear internal space partitioned by the partition wall, and configured to control an airflow volume of the front air conditioning portion to increase when a pressure difference in the front internal space and the rear internal space reaches a predetermined level.

15. A method for controlling a pressure of the mobility including the negative pressure space of claim 1, the method including:
confirming, by a control unit electrically connected to the air conditioning unit, whether the partition wall is provided according to occurrence of a patient;
switching, by the control unit, the air conditioning unit to an outdoor air mode in accordance with confirmation of whether the air conditioning unit is an indoor air mode or the outdoor air mode when the installation of the partition wall is confirmed; and
operating, by the control unit, the air conditioning unit and the exhaust unit.

16. The method of claim 15, wherein when the air conditioning unit includes a front air conditioning portion and a rear air conditioning portion, the front air conditioning portion is switched to the outdoor air mode and the rear air conditioning portion is switched to the indoor air mode in the switching.

17. The method of claim 15, wherein when the air conditioning unit includes a front air conditioning portion and a rear air conditioning portion, a temperature of the negative pressure space and a temperature of a remaining space of the partitioned spaces are individually controlled through operation of the front air conditioning portion and the rear air conditioning portion, respectively, in the operating.

18. The method of claim 17, wherein the operating of the air conditioning unit and the exhaust unit further includes:
checking a pressure in the remaining space and a pressure of the negative pressure space; and
increasing an airflow volume of the front air conditioning portion when a pressure difference between the remaining space and the negative pressure space reaches a set level through the checking.

19. A non-transitory computer readable storage medium on which a program for performing the method of claim 15 is recorded.

\* \* \* \* \*